United States Patent
Zoback

[11] Patent Number: 5,254,798
[45] Date of Patent: Oct. 19, 1993

[54] SECONDARY CONTAINMENT STRUCTURES FOR HAZARDOUS MATERIALS

[75] Inventor: Harry A. Zoback, Warminster, Pa.

[73] Assignee: Warminster Fiberglass Company, Southampton, Pa.

[21] Appl. No.: 912,736

[22] Filed: Jul. 13, 1992

[51] Int. Cl.$^5$ ............................ B09B 5/00; B32B 9/00
[52] U.S. Cl. .................................. 588/259; 52/169.5; 108/51.1; 588/249
[58] Field of Search .................... 405/52, 128, 129; 588/249, 259; 14/69.5; 52/169.5; 108/51.1; 210/163, 164, 170, 172

[56] References Cited

U.S. PATENT DOCUMENTS

| | | | |
|---|---|---|---|
| 2,410,338 | 10/1946 | Craine | 52/169.5 |
| 2,993,600 | 7/1961 | Ressler | 210/164 |
| 4,536,427 | 8/1985 | Kohn | 156/264 X |
| 4,817,224 | 4/1989 | Visnaw et al. | 14/69.5 |
| 4,950,105 | 8/1990 | Meess et al. | 405/128 |
| 4,973,195 | 11/1990 | Sweeney et al. | 405/128 |
| 5,022,786 | 6/1991 | Philo | 405/128 |
| 5,092,251 | 3/1992 | Hamaker et al. | 108/51.1 |
| 5,130,016 | 7/1992 | Gavin | 210/164 |

Primary Examiner—David H. Corbin
Attorney, Agent, or Firm—Michael Ebert

[57] ABSTRACT

A secondary containment structure for the safe storage of hazardous materials held in primary containers, such as drums, cans and bottles. In large sizes, the containment structure is adapted to function as a pallet or as the floor of a building or shelter for primary containers. The structure includes a core formed of an end-grain balsa wood base and a rectangular frame placed thereover formed of the same or similar material to define the bed and the side walls of a sump. The inner edges at the upper end of the frame are indented to create a ledge to accommodate a fiberglass grating. The containers to be stored are seated on the grating, whereby leakage or spillage from the containers are collected in and confined to the sump. Laminated to the exposed surfaces of the core is a layer of a fiberglass-reinforced plastic material, whereby the resultant laminate, though light in weight, is of exceptional strength. In a smaller size, the containment structure functions as a shelf on which small containers may be seated, the structure having mounting flanges integral therewith so that the shelf may be supported on wall brackets.

7 Claims, 3 Drawing Sheets

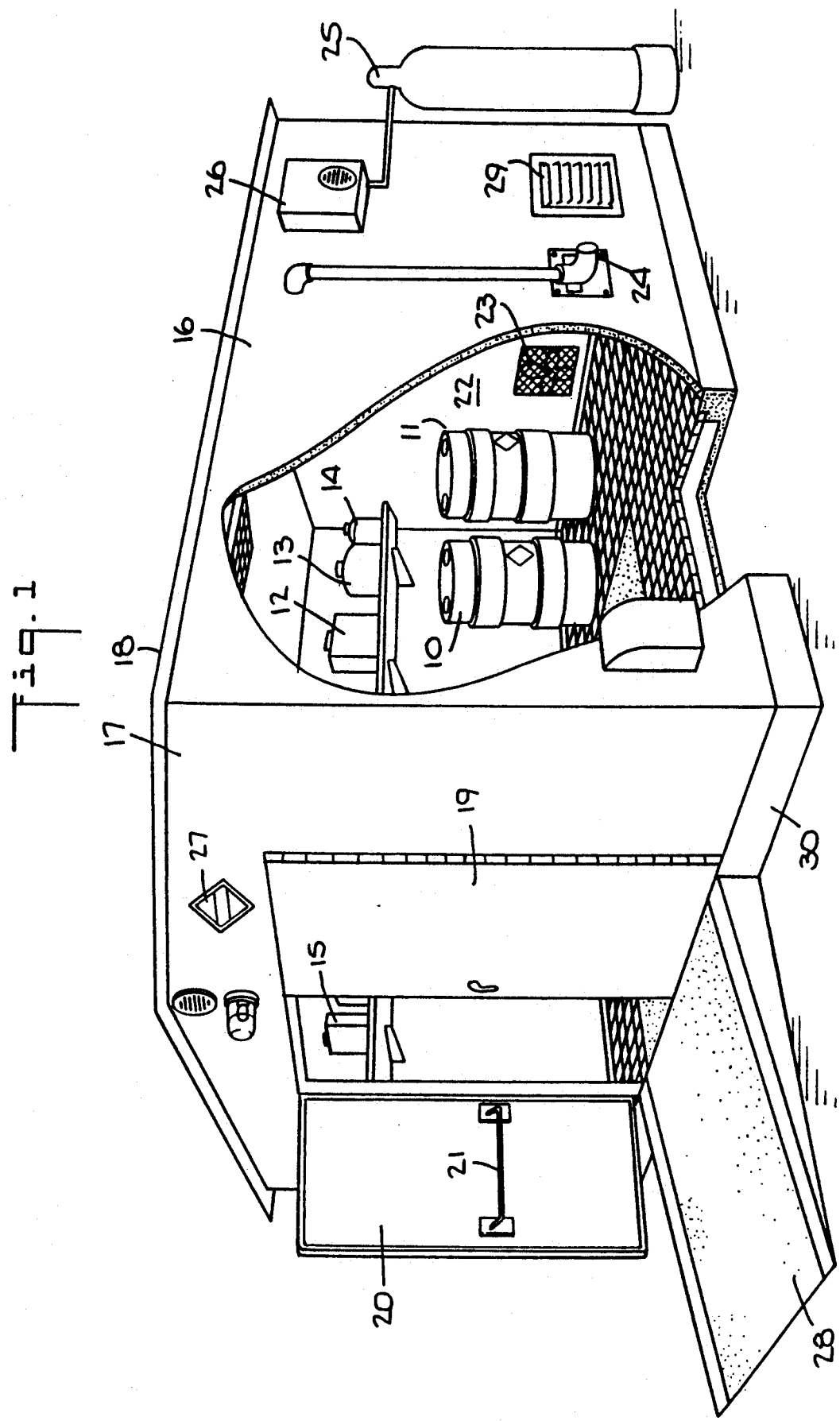

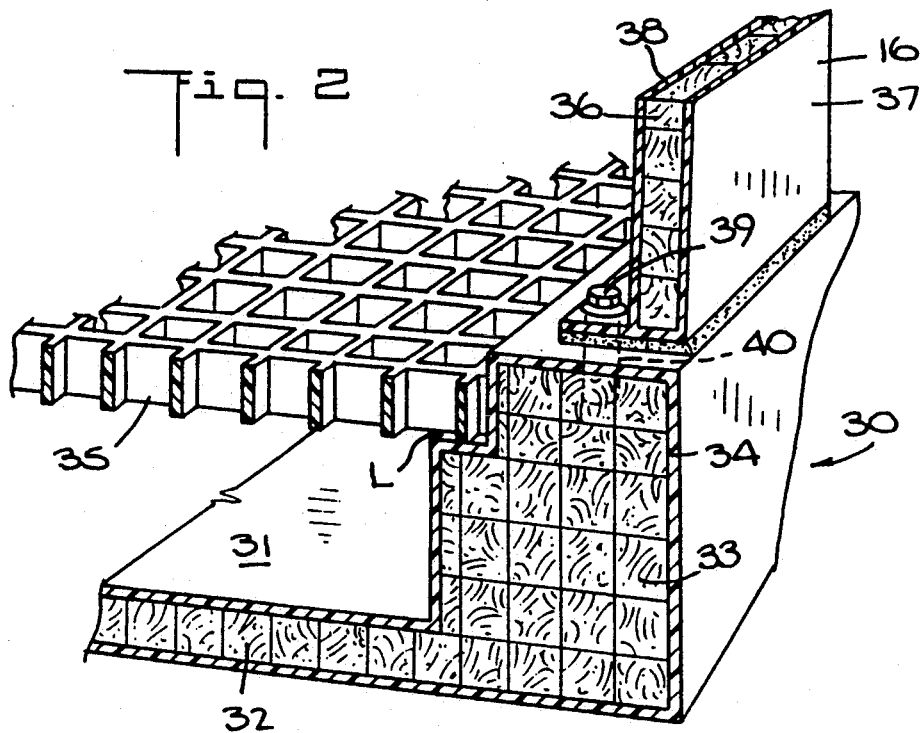
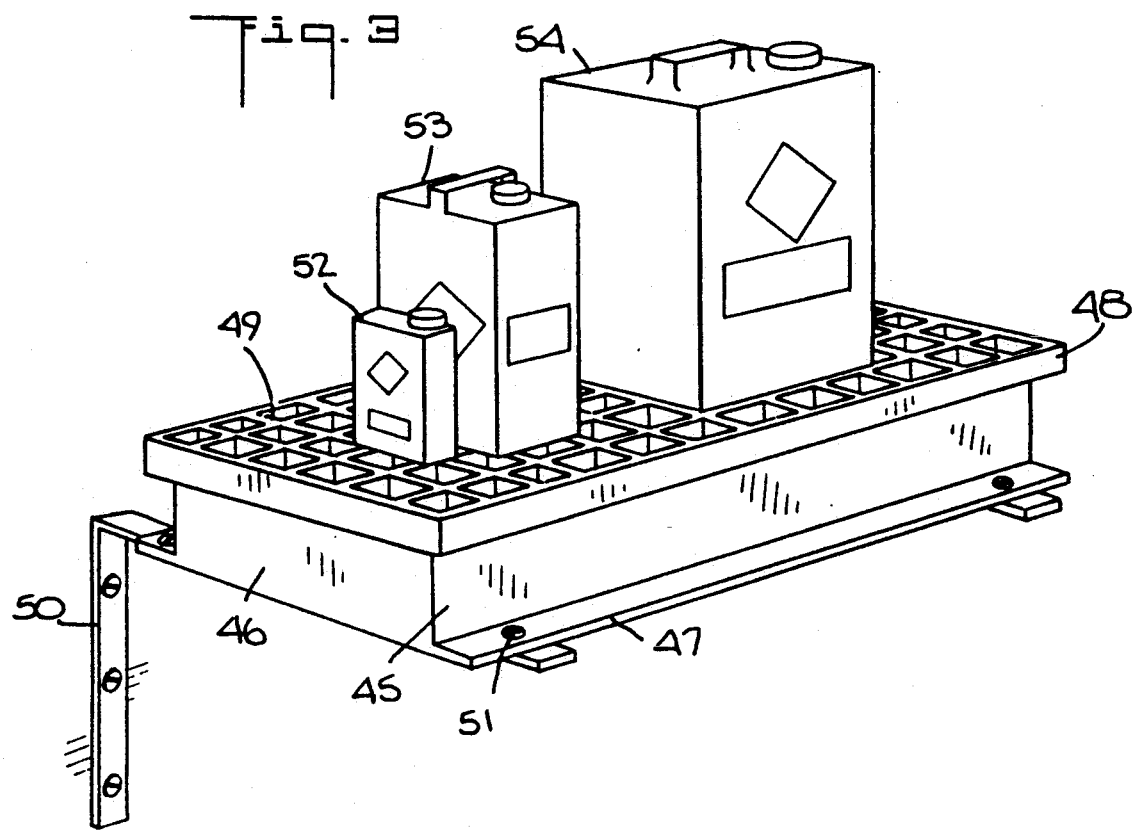

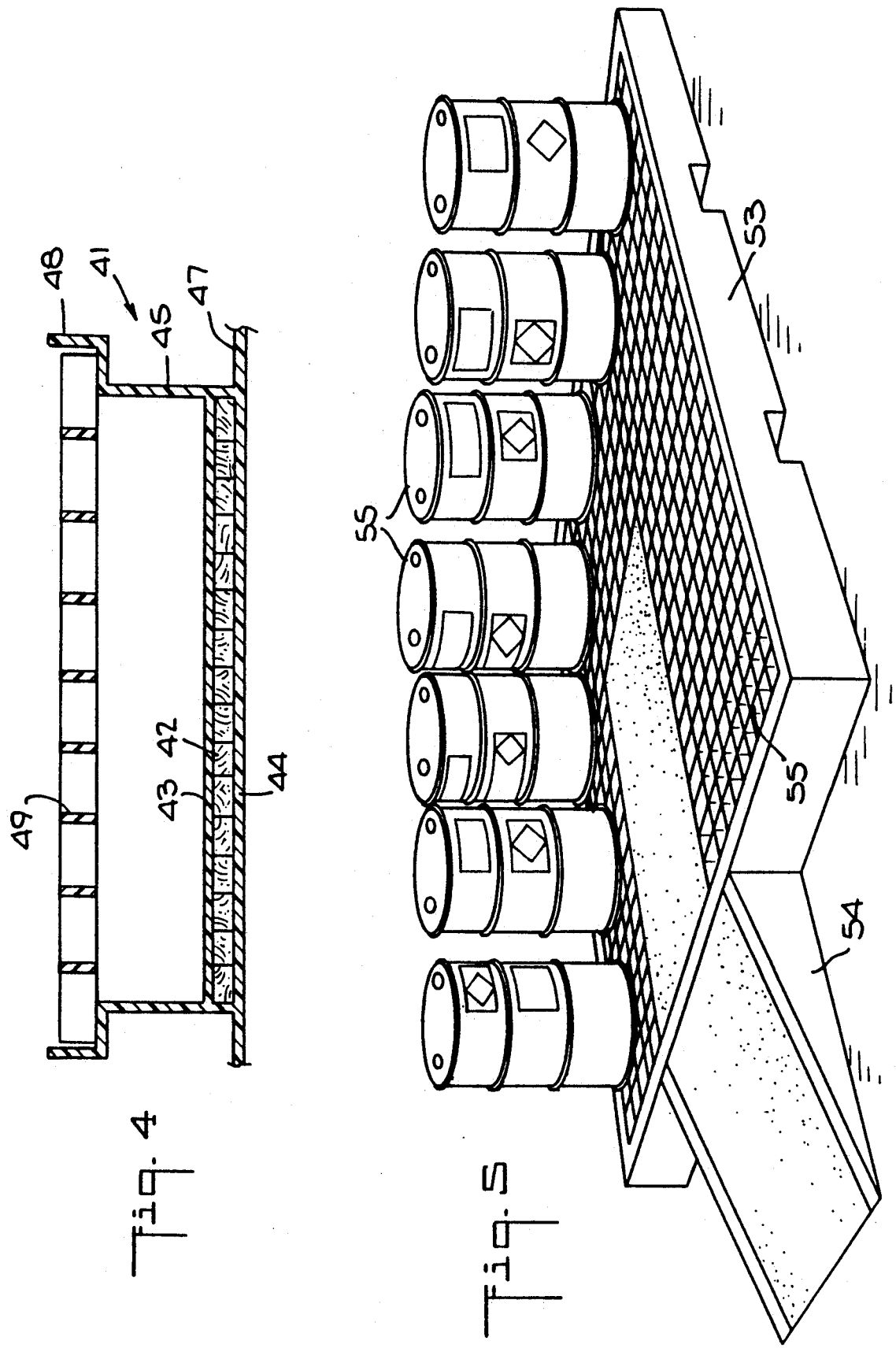

SECONDARY CONTAINMENT STRUCTURES FOR HAZARDOUS MATERIALS

BACKGROUND OF INVENTION

1. Field of Invention:

This invention relates generally to the secondary containment of hazardous materials and residual wastes, and more particularly to a secondary containment structure which, depending on its size, is adapted to serve as a pallet, the floor of a building or other enclosure for storing primary containers, or as a shelf for primary containers.

2. Status of Prior Art:

Modern industrial and commercial activity often result in the generation of residual materials and wastes that may be hazardous. Hazardous waste is any by-product generated by this activity that is potentially dangerous to the environment or injurious to humans. The wastes, whether in solid, liquid or gaseous form, are considered to be hazardous if they possess any one of the following characteristics:

Characteristic A. The waste is toxic and if improperly handled may cause illness and other health problems.

Characteristic B. The waste is ignitable and may catch fire.

Characteristic C. The waste is corrosive and, on contact, is capable of corroding materials as well as human tissue.

Characteristic D. The waste is violently reactive with water and may cause an explosion.

The National Fire Protection Association defines hazardous materials as "any substance that by reason of being explosive, flammable, poisonous, corrosive, oxidizing, irritating or otherwise harmful, is likely to cause injury or death."

It is of the utmost importance that hazardous materials be handled and stored in a manner complying with prevailing regulatory agency requirements, environmental regulations and local ordinances covering such materials. The consequences of non-compliance with federal, state or municipal codes may be very serious to those companies which generate hazardous materials, for not only will they be subjected to heavy fines, but the officers of these companies may be held criminally liable for any accident resulting in death or injury.

Under existing environmental protection agency regulations, one must make use of primary containers such as drums, cans and bottles that are fabricated or lined with materials that will not react with and are otherwise compatible with the hazardous waste to be stored. Primary containers must always be closed during storage, except when it becomes necessary to add or remove waste. And primary containers holding hazardous wastes must not be opened, handled or stored in a manner that may rupture the container or cause it to leak.

Yet not all primary containers live up to these requirements, and their integrity may be impaired by severe rusting or other structural defects, as a result of which leakage is experienced.

In order to prevent the release of hazardous wastes from primary containers into the environment, the regulations calls for secondary containment systems so designed and operated as to prevent any migration of wastes or accumulated liquid out of the system to the soil, ground water or surface water. These regulations require that the capacity of the containment system must be sufficient to contain 10% of the volume of the container or the volume of the largest container, whichever is largest.

Various types of secondary containment structures are now commercially available. An elementary form of such structure is the spill containment tray sold under the trademark SAFE-T-TRAY by Safety Storage, Inc., of Campbell, Calif. This tray is formed of polypropylene and is provided with a spill grate of the same material. Thus if a bottle containing a hazardous liquid is to be stored on a shelf, the spill containment tray is placed on the shelf and the bottle is then rested on the spill grate, so that any leakage from the bottle is collected in the tray.

The Safety Storage Company also markets a portable hazardous liquid spill containment sump constructed of steel and provided with a fiberglass grating. This sump can accommodate as many as forty 55-gallon drums of hazardous liquid. The sump is provided with fork lift pockets for easy relocation inside or outside a plant. The sump is also provided with a drain to remove hazardous liquid collected therein.

The Utensco P&D Company of Port Washington, New York, makes metal pallets which can support two or four drums and which can be transported by fork lift trucks. The pallets include an internal catch basin to hold hazardous spills or leaks.

And the Precision Quincy Corporation of Woodstock, Ill., makes portable buildings of welded steel construction for storing hazardous waste drums, the building having a fiberglass flow grating and an under floor sump to collect and retain spillage or leakage.

Inasmuch as a secondary containment structure in accordance with the invention makes use of structural sandwich laminates in which an end grain balsa wood core is laminated to fiberglass-reinforced plastic facing skins, the patents to Lippay, 3,298,892, to Shook et al., 3,376,185, and to Kohn, 4,536,427 are of prior art interest.

SUMMARY OF INVENTION

In view of the foregoing, the main object of this invention is to provide a secondary containment structure for the safe storage of hazardous materials held in primary containers, the structure being formed entirely of non-metallic material and being of light weight and high strength.

More particularly, an object of the invention is to provide a structure of the above type having a core formed mainly of balsa wood that defines a sump, the outer surface of the core having laminated thereto a fiberglass-reinforced plastic layer forming with the core a chemically-resistant structural laminate of high strength.

A significant feature of the invention is that the secondary containment structure, depending on its scale, can serve as the floor of a secondary containment building or other shelter for primary containers or as a portable or relocatable pallet, or as a shelf.

Briefly stated, these objects are attained in a secondary containment structure for the safe storage of hazardous materials held in primary containers, such as drums, cans and bottles. In large sizes, the containment structure is adapted to function as a pallet or as the floor of a building or shelter for primary containers. The structure includes a core formed of an end-grain balsa wood base and a rectangular frame placed thereover formed of the same or similar material to define the bed and the side walls of a sump. The inner edges at the upper end of the frame are indented to create a ledge to accommodate a fiberglass grating. The containers to be stored are seated on the grating, whereby leakage or spillage from the containers are collected in and confined to the sump. Laminated to the exposed surfaces of the core is a layer of a fiberglass-reinforced plastic material, whereby the resultant laminate, though light in weight, is of exceptional strength. In a smaller size, the containment structure functions as a shelf on which small containers may be seated, the structure having mounting flanges integral therewith so that the shelf may be supported on wall brackets.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a building in accordance with the invention for the secondary containment of hazardous wastes;

FIG. 2 is a cut-away perspective of the floor of the building which functions as a sump to collect spillage and leakage from primary containers stored in the building;

FIG. 3 is a perspective view of a secondary containment shelf that is mounted on a side wall of the building:

FIG. 4 is a transverse section taken through the shelf; and

FIG. 5 is a perspective view that is partly cut away of a secondary containment pallet in accordance with the invention.

DESCRIPTION OF INVENTION

Secondary Containment Building:

Referring now to FIG. 1, there is shown a secondary containment building in accordance with the invention for storing primary containers holding hazardous waste material, such as large drums 10 and 11 which rest on the secondary containment floor of the building, and smaller cans and bottles 12, 13, 14 and 15 which rest on secondary containment shelves secured to the side walls of the building.

The building includes side walls 16, a front wall 17, a rear wall 22 and a sloped roof 18. The front wall 17 is provided with hinged doors 19 and 20, door 20 having panic hardware 21 installed thereon to permit a quick exit from the building.

Mounted on rear wall 22 of the building is a forced air exhaust ventilator 23. Mounted on one of the sidewalls 16 is an air intake vent 29. The building is provided with a sprinkler system having a Fire Department connection 24 mounted on the exterior of side wall 16. Also provided is a fire suppression system 25 which operates in conjunction with an alarm 26. Attached to front wall 17 above the door is a warning placard 27. Associated with the front entry of the building is a removable ramp 28.

The floor of the building is generally designated by numeral 30. As shown separately in FIG. 2, floor 30 is composed of a balsa wood core which is configured to define a rectangular sump 31 whose bed has a core defined by a base 32 of end grain balsa wood blocks above which is a rectangular frame 33 also formed of such blocks. Hence the balsa core is constituted by base 32 and frame 33.

Balsa has outstanding properties unique in the lumber field. It averages less than 9 pounds per cubic foot, which is 40 percent of the weight of the lightest North American species. Its cell structure affords a combination of high rigidity and compressive and tensile strength far superior to any composite or synthetic material of equal or higher density. It is known that end-grain balsa is capable of supporting far greater loads than flat-grain material of the same density and also that low-density material will, in the end-grain direction, support greater loads than flat-grain wood of higher density.

Structural composite laminates are fabricated by bonding thin facings or skins of high tensile and compressive strength to lightweight core materials. The main function of the bonded core material in the composite is to stabilize and stiffen the thin facings so that the major part of the load is borne thereby. The bonded core also converts the two skins into a unitary structure of great rigidity, so that they deform much less under load than they would unjoined.

It is known that laminates of high strength-to-weight ratio can be realized by combining the superior properties of end-grain balsa cores with the required facing material. End-grain balsa of good quality has a uniformly high compressive strength as well as a high modulus of rigidity and elasticity. Such balsa core composite laminates, in addition to their excellent mechanical properties and dimensional stability, also afford highly effective thermal insulation. Moreover, where the composite undergoes cyclic flexure, shock and vibration, it will be found that a balsa core is less subject to fatigue than other core materials.

Where the structure to be reinforced is constituted by planar surfaces, the balsa core may be simply a solid slab of material laminated to the facings. But in the case of hulls and other structures having single or double curvatures, or other complex contours, it is ordinarily not possible to conform the solid balsa to the contour without bending the balsa slab, and this involves difficult, time-consuming and expensive techniques.

In recent years, balsa blankets have been developed composed of individual balsa blocks which are attached to a common carrier, such as a fabric scrim, whereby the blanket may readily be conformed to a curved surface for lamination thereto. Such blankets are useful in the construction of reinforced plastic boats and larger vessels, for they lend themselves to lamination between layers of reinforced fiberglass or other plastic material, thereby bringing about a distribution of weight favorable to high stability and buoyancy, as well as imparting stiffness to the structure. Such balsa wood blocks are commonly available, the blocks being produced by the Baltek Corporation of N.J. The advantage of balsa blankets for applications which do not require conformance to a curved surface is that the blankets may be readily cut to any desired dimension.

The inner edge of the upper end of balsa wood frame 33 is indented to define a ledge L to accommodate a high-strength fiberglass grating 35 which rests on the ledge. The ledge holding fiberglass grating 35 is a little higher than the thickness of the grating to prevent any container from slipping off the ledge. The balsa wood core is covered by a skin or layer 34 formed of fiberglass-reinforded plastic material which is laminated to the core and completely envelops it to create a structural laminate which though of light weight has exceptional strength.

The facing skin for the balsa wood core is created by a mat of chopped fiberglass which is impregnated with a laminating resin that bonds the mat to the outer surface of the core and forms the reinforced plastic layer 34. The exterior surface of layer 34 is coated with a thixotropic, chemically-resistant gel coat that provides an exterior surface that will not crack, peel or deteriorate, the gel coat also being resistant to ultraviolet radiation. In practice, the balsa core or only the frame portion thereof may also be filled with a rigid polyisocyanurate foam board.

Floor 30 which functions as a sump is of one-piece unitary construction. It is designed to have a sump capacity that exceeds federal secondary containment requirements. Grating 35, which rests upon ledge L, is removable to allow access to the sump for periodic inspection and for clean-up when necessary.

Associated with the sump is a standard drain and cut-off valve (not shown) for draining off the liquid collected in the sump as a result of leakage or spill from the primary containers.

The roof as well as the walls of the building, such as side wall 16 shown in FIG. 2, are also in the form of structural composite laminates. Wall 16 is composed of a core 36, preferably of end-grain balsa, but which may also be constituted by a rigid foam plastic material such as polyisocyanurate to which outer skins 37 and 38 are laminated, these skins being formed by a layer of fiberglass-reinforced plastic; the same as is used in the floor. Sidewall 16 is joined to floor 30 by stainless steel bolts 39 that are inserted into threaded sockets 40 embedded in the frame section 33 of the balsa core. The outer surfaces of the walls and roof of the building are all gel-coated to render them chemically resistant.

The building, despite its relatively light weight, has high structural strength, and the floor is capable of sustaining both the load of the building walls and the load imposed thereon by the high capacity primary containment drums stored in the building.

The strength of the building is such that it is also able to withstand snow loading and wind loading. And because of the thermal insulation properties of balsa and polyisocyanurate foam board, it provides thermal protection and weather resistance. The fiberglass-reinforced plastic composite of which the building is constructed is electrically non-conductive, this being an important safety factor in hazardous material storage.

Storage of hazardous material is not the only practical application for the building which, by reason of its light weight, can easily be relocated. The building can, for example, be used to house pollution monitoring equipment, chlorination equipment, water and wastewater treatment equipment, field-mounted instrumentation and firefighting equipment.

And because the floor is of unitary construction and the walls of the building are bolted to the floor and to each other, the building may be readily dismantled and shipped in a knock-down flat state and readily erected at a desired site.

The building may be constructed in any desired size, the smallest being a shed or cabinet to store a relatively small amount of hazardous material.

Secondary Containment Shelf:

In a secondary containment shelf 41 in accordance with the invention, as shown in FIGS. 3 and 4, the shelf includes a sump whose bed is formed by a rectangular base 41 of balsa wood blocks laminated to upper and lower skins 43 and 44 of fiberglass-reinforced plastic material. Skins 43 and 44 are integral with the side walls 45 and the end walls 46 of a tray and with mounting flanges 47 which project outwardly from either side of the base, all of which are formed of fiberglass-reinforced plastic material. Thus the fiberglass-reinforced plastic material defines the walls and base of a tray and also the mounting flanges which transform the tray into a secondary containment shelf.

The upper ends of sidewalls 45 and end walls 46 are shaped to define a ledge 48 to accommodate a removable fiberglass spill grating 49.

Because the secondary containment tray functions as a shelf, it can, as shown in FIG. 3, be mounted on brackets 50 attached to a vertical wall, the flanges being attached thereto by stainless steel screws or bolts 51 so that the shelf remains in place. Resting on the shelf are primary containers, such as small containers 52, 53 and 54. Any leakage or spill from these containers will be collected in the shelf sump. In practice, in order to provide a shelf of exceptional strength, the side walls thereof may be formed of a laminate of balsa and fiberglass-reinforced plastic skin, the balsa of the sidewalls resting on the end grain balsa wood base.

Thus instead of a secondary containment tray as in the prior art which when placed on a shelf can be dislodged therefrom, a secondary containment shelf according to the invention cannot be dislodged—an important safety feature.

This shelf is dimensioned for relatively small primary containers that can conveniently be supported against a sidewall in a building whose floor is reserved for much larger and heavier primary containers, or installed where the larger containment is not required. The shelf can be constructed in various lengths, widths and heights to provide a range of sump capacities.

Secondary Containment Pallet:

The need often arises for a secondary containment pallet on which one can rest large primary containment drums at any desired indoor or outdoor site. A pallet in accordance with the invention, being light-weight and portable, can be transported by a fork lift to the site or even be hand carried when the pallet is unloaded.

The pallet 53, shown in FIG. 5, rests on an array of I beams or on other means which raise the pallet above ground and provide pockets for a fork lift. Also provided is a removable ramp 54 so that the pallet can be loaded and unloaded.

The pallet is of a unitary construction and has essentially the same construction as that of the floor 30 shown in FIGS. 1 and 2. Thus the pallet has a balsa core formed by a base and a rectangular frame placed thereon, the core being enveloped by a fiberglass-reinforced plastic skin laminated to the core, and a removable fiberglass grating 55 which is accommodated on a ledge defined by the frame of the core. Drums 56 rest on the grating, so that any spill or leakage falls into the sump. The pallet is also provided with a drain and valve (not shown).

While there have been shown and described preferred embodiments of secondary containment structures for hazardous materials in accordance with the invention, it will be appreciated that many changes and modifications may be made therein without, however, departing from the essential spirit thereof.

I claim:

1. A light-weight, high strength secondary containment structure for the safe storage of hazardous materials held in primary containers such as drums, cans and bottles, the structure comprising:

(a) a core formed by a rectangular base having a rectangular frame placed thereon to define a sump, the core being fabricated mainly of end-grain balsa wood;

(b) a layer of fiberglass-reinforced plastic material enveloping the core and laminated thereto to form a unitary structural laminate of high strength; and (c) a removable spill grating resting on the enveloped frame of the core to accommodate said container, whereby spill and leakage from containers placed on the grating are collected in said sump, the inner edge of the frame at its upper end being indented to form a ledge surrounding the sump to receive the grating.

2. A structure as set forth in claim 1, wherein said layer is coated with a corrosion-resistant gel coat.

3. A structure as set forth in claim 1, wherein said structure constitutes the floor of a building for storing said container, said building including sidewalls mounted on the floor and bolted to the frame of the core.

4. A structure as set forth in claim 3, wherein said sidewalls are formed by a balsa wood core to which are laminated facing skins formed of fiberglass-reinforced plastic material.

5. A structure as set forth in claim 4, wherein said building includes a front wall formed of the same material as said sidewalls and provided with hinged doors to provide a building entry.

6. A structure as set forth in claim 5, wherein said sidewalls have at least one secondary containment shelf mounted thereon.

7. A structure as set forth in claim 1, wherein said structure is dimensioned to form a portable pallet.

* * * * *

UNITED STATES PATENT AND TRADEMARK OFFICE
CERTIFICATE OF CORRECTION

PATENT NO. : 5,254,798

DATED : October 19, 1993

INVENTOR(S) : Harry A. Zoback

It is certified that error appears in the above-indentified patent and that said Letters Patent is hereby corrected as shown below:

Column 7, line 11, delete "container," and substitute —containers,—.

Signed and Sealed this

Tenth Day of May, 1994

Attest:

BRUCE LEHMAN

*Attesting Officer*      *Commissioner of Patents and Trademarks*